United States Patent [19]  
Stern, deceased et al.

[11] 4,004,615  
[45] Jan. 25, 1977

[54] PARTS SUBJECT TO WEAR IN SEPARATORS, CYCLONES, PIPELINES AND SIMILAR APPARATUS

[75] Inventors: Hans Stern, deceased, late of Dortmund-Hochsten, Germany, by Erika Stern, heir; Werner Strauss, Bochum, Germany

[73] Assignee: Klockner-Humboldt-Deutz Aktiengesellschaft, Cologne, Germany

[22] Filed: Feb. 4, 1975

[21] Appl. No.: 547,044

[30] Foreign Application Priority Data

Feb. 4, 1974 Germany ............................ 2405298

[52] U.S. Cl. .............................. 138/177; 29/183.5; 29/193.5; 138/37; 138/39; 138/178
[51] Int. Cl.² ...................... F15D 1/06; F16L 57/00; B04C 1/00; B07B 4/00
[58] Field of Search ................. 29/379, 183, 183.5, 29/185, 193, 193.5, 190; 138/177, 37, 39, 178

[56] References Cited

UNITED STATES PATENTS

| 107,006 | 9/1870 | Collier | 29/193.5 |
|---|---|---|---|
| 1,053,614 | 2/1913 | Layne | 29/190 |
| 2,064,322 | 12/1936 | Ruppert | 29/183 X |
| 2,396,114 | 3/1946 | Neuerburg | 29/193 |
| 2,407,671 | 9/1946 | Mesnel | 29/183 |
| 2,925,650 | 2/1960 | Pall | 29/193 X |
| 3,047,091 | 7/1962 | Gerli | 138/108 X |
| 3,258,318 | 6/1966 | Gruhl | 29/183 |
| 3,352,769 | 11/1967 | Ruben | 29/183 X |
| 3,869,778 | 3/1975 | Yancey | 29/191 |
| 3,905,775 | 9/1975 | Sowards et al. | 138/177 X |
| 3,934,614 | 1/1976 | Elek et al. | 138/108 X |

FOREIGN PATENTS OR APPLICATIONS

| 1,089,219 | 3/1955 | France | 29/552 |
|---|---|---|---|
| 565,734 | 8/1957 | Italy | 29/547 |

Primary Examiner—Arthur J. Steiner  
Attorney, Agent, or Firm—Herbert L. Lerner

[57] ABSTRACT

Wear members in separators, cyclones, pipelines and similar apparatus, which are abrasively worn by a particle-conducting flow, said wear members having increased durability as a result of increased surface roughness.

8 Claims, 3 Drawing Figures

PARTS SUBJECT TO WEAR IN SEPARATORS, CYCLONES, PIPELINES AND SIMILAR APPARATUS

The invention relates to a method of increasing the durability of parts subject to wear or wear members in separators, cyclones, pipelines and similar apparatus, wherein the wear members are abrasively worn by a particle-conducting flow; and to a device produced by the method.

With all flowing media that are employed for treating or transporting granular materials, the difficulty arises that the transported materials, due to the abrasive action thereof, exert a marked wearing effect on housing walls, fan blades, pipeline bends or elbows, drip tubes and the like. For this reason, many of these parts have only limited durability and must be replaced from time to time. This is especially true for blower or fan impellers in gyratory separators.

Heretofore, through the insertion of hardened metals, cast plates or surface-hardened materials, efforts have been made to keep this abrasive effect of the entrained particles as minimal as possible.

These heretofore known, prior-art solutions, however, considerably increase the cost of the respective parts and, in addition, offer only inadequate protection against the abrasive effect of the respective transported particles. In many cases, an effort has been made, therefore, to achieve an improvement in durability by coating the parts with synthetic or plastic materials or hard rubber. In the case of rapidly moving machine parts wherein great accelerations occur, this solution is not possible, however, because the accelerations that occur produce stressing beyond the tensile-strength limit of the wear-resistant materials. Similarly, the use of these materials, when there is temperature stressing, is not possible.

It is accordingly an object of the invention to provide a method and device for increasing the durability of wear members in separators, cyclones, pipelines and similar apparatus which avoids the disadvantages of the heretofore known devices of this general type. More specifically, it is an object of the invention to provide such a method and device at minimal expense and which has a tensile strength that resists the stressing occurring in rapidly moving machine parts, for example.

With the foregoing and other objects in view, there is provided, in accordance with the method of the invention, the step of forming a marginal layer of considerable thickness at the surface of the wear members. This construction, according to the invention, has the advantage that the abrasive particles present in the flow are held spaced from the surface of the wear members. Due to the increase in the thickness of the marginal layer, an air cushion is produced on the surface of the wear members and is formed of a stationary layer of the flow-capable medium, which swirls about within itself. In the air cushion, the component of the entrained particles sinks downwardly essentially and, for a simultaneously reduced velocity of the particles, no abrasive effect is thus exerted any longer on the wear members.

In accordance with another feature of the invention, the formation of the enlarged marginal layer is effected by producing an increase in the macro-surface roughness of the wear members. This construction according to the invention has the advantage that a measure that is relatively easy to carry out is involved, that the measure can be carried out without very great expense and reliably produces a considerable increase in the marginal layer. Because of the relatively high flow velocities, the flow referred to herein is always of the turbulent type wherein the formation of an increased marginal layer by changing the micro-roughness of the wear member is not possible. By micro-roughness there is understood to mean a roughness produced by machining or treatment which is ordinarily below a roughness depth of 0.1 mm. Also, it is impossible to attain a marginal layer increase by varying the inner friction of the flowing media, because this measure would be connected with considerable expense.

In accordance with a further feature of the invention, the increase in the macro-surface roughness occurs through the formation of holes or beads or corrugations, preferably through the formation of elongated holes or slots, in the wear members. With the use of elongated holes, greatly desired weight-saving in the wear members is effected, which permits a more light-weight construction of the entire structure. The same flow-dynamic effect is attained by the use of corrugations and, although no weight-saving results therefrom, nevertheless, a light, self-hardened construction is obtained.

In accordance with an alternate feature of this invention, the increase in the macro-surface roughness is produced by forming ribs or bulges on the surface of the wear members. Thereby, with structural parts with which a weight increase is of little importance, a reinforcement of the wear member is advantageously achieved and, especially, protection is provided against the coarser particles, which eventually penetrate the marginal layer, and which had been entrained by the flow.

In accordance with the device of the invention, the elongated holes, corrugations, ribs or the like extend transversely to the direction of flow in offset relationship one to another. This disposition thereof permits the best effect upon the marginal layer, because always new, small turbulence fronts, which lead to an increase in the marginal layer, are formed behind the transversely disposed elongated holes or ribs. Due to the mutually offset array, flow apertures developing between the individual elongated holes or corrugations or ribs are opened so that, although only short flow barriers become constructed, a penetrating barrier front is formed for the flow.

Furthermore, in accordance with yet another feature of the invention, the elongated holes, ribs or corrugations have a length-to-width ratio of from substantially 4:1 substantially 8:1. Elongated holes, ribs or corrugations having such a length-to-width ratio are capable of being produced especially easily because the tools necessary for producing these flow barriers are relatively easy to produce and to assemble. For small ratios of length-to-width, such advantageous conditions or relationships are not obtained, since the flow barriers approximate bulges or knobs, and for very long flow barriers, the required tools and devices become too costly.

In accordance with additional features of the invention, the elongated holes, ribs or corrugations have rounded or beveled edges. Through these features, it is advantageously possible to protect the edges that could become damaged and that would break off, especially due to the coarse particles of material which are entrained by the flow and may penetrate the marginal layer.

In accordance with a concomitant feature of the invention, the surface in which the elongated holes are formed and the surface of the ribs or corrugations are hardened, preferably cold hardened. Thereby, an advantageous improved durability is attained as a result of the hardened surface, the surface hardening occurring expediently when the elongated holes or corrugations are formed, so that no additional costly operation is required. The durability of the wear surface is thereby further increased.

Other features which are considered as characteristic for the invention are set forth in the appended claims.

Although the invention is illustrated and described herein as method and device for increasing the durability of parts subject to wear in separators, cyclones, pipelines and the like, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawing, in which.

Figure 1:
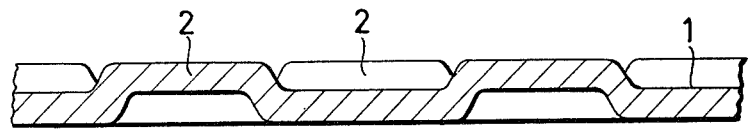
FIG. 1 is a fragmentary sectional view of a wear member wherein the marginal layer is formed of corrugations.

Referring now to the figures and, first, particularly to FIG. 1 thereof, there is shown the surface 1 of a wear member that is formed with upwardly curved corrugations 2. Thus, the surface level 1 is shown between the corrugations 2, and the corrugations 2 are disposed in offset or staggered array on the surface 1.

Figure 2:
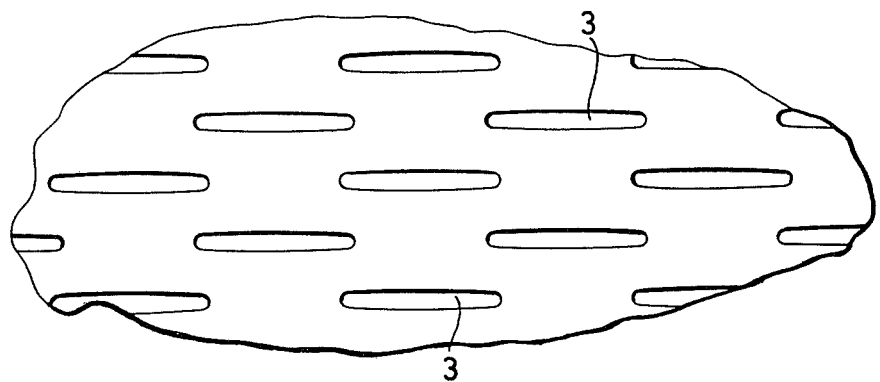
FIG. 2 is a fragmentary plan view of another wear member wherein the marginal layer is formed of longitudinal holes or slots.

In FIG. 2, the elongated holes or slots 3 are readily visible and are, like the corrugations 2 in the embodiment of FIG. 1, staggered or offset with respect to one another.

Figure 3:
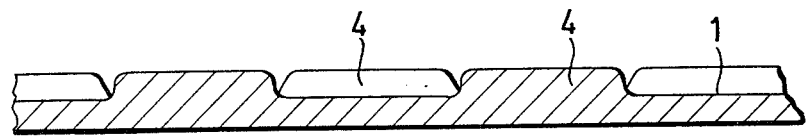
FIG. 3 is a fragmentary sectional view of yet another wear member wherein the marginal layer is formed of ribs disposed on the surface of the wear member.

In the embodiment of FIG. 3, the surface 1 of the wear member carrier ribs 4 which are also offset or staggered relative to one another, the ribs 4 rising above virtually the entire surface area of the wear member.

We claim:

1. In apparatus in which there is a particle-conducting flow, such as separators, cyclones, pipelines and similar apparatus, and where a part of said apparatus, designated wear members, is in contact with said particle-conducting flow and is abrasively worn by said particle-conducting flow, the improvement comprising a plurality of spaced depressions in said contact surface of said wear member producing an increase in the macro surface roughness above a roughness depth of 0.1 mm, of the wear member and forming a flow-marginal layer at the surface of the wear member spacing the abrasive particles in the flow from the surface of the wear member and in which layer entrained particles sink downwardly at reduced velocity with reduced abrasive effect.

2. Apparatus having wear member according to claim 1 wherein said depressions constitute a multiplicity of elongated means extending transversely to the direction of flow in offset relationship one to another.

3. Apparatus having wear member according to claim 2 wherein said multiplicity of elongated means are formed as slots in the surface of the wear members.

4. Wear member according to claim 2 wherein said multiplicity of elongated means are formed as ribs on the surface of the wear members.

5. Apparatus having wear member according to claim 2 wherein said elongated means have a length-to-width ratio of from substantially 4:1 to 8:1.

6. Apparatus having wear member according to claim 2 wherein said elongated means have rounded edges.

7. Wear member according to claim 2 wherein said elongated means have beveled edges.

8. Apparatus having wear member according to claim 2 wherein said elongated means have a strain-hardened surface.

* * * * *